(12) United States Patent
Lin et al.

(10) Patent No.: US 8,244,054 B2
(45) Date of Patent: Aug. 14, 2012

(54) METHOD, APPARATUS AND INTEGRATED CIRCUIT CAPABLE OF REDUCING IMAGE RINGING NOISE

(75) Inventors: Chih-Jung Lin, Taipei County (CN); Pei-Lin Hou, Taipei County (CN)

(73) Assignee: Panasonic Corporation, Osaka (JP)

( * ) Notice: Subject to any disclaimer, the term of this patent is extended or adjusted under 35 U.S.C. 154(b) by 877 days.

(21) Appl. No.: 12/374,511

(22) PCT Filed: Jul. 25, 2007

(86) PCT No.: PCT/JP2007/065031
§ 371 (c)(1),
(2), (4) Date: Jan. 21, 2009

(87) PCT Pub. No.: WO2008/018331
PCT Pub. Date: Feb. 14, 2008

(65) Prior Publication Data
US 2009/0310882 A1 Dec. 17, 2009

(30) Foreign Application Priority Data

Aug. 11, 2006 (CN) .......................... 2006 1 0110982

(51) Int. Cl.
*G06K 9/40* (2006.01)
*G06K 9/36* (2006.01)
(52) U.S. Cl. ..................................... 382/268
(58) Field of Classification Search .................. 382/162, 382/167, 254, 262, 264, 268, 272, 274, 275, 382/284, 299; 348/241, 441–448, 607; 375/240.16; 358/463, 518, 530, 532; 341/51
See application file for complete search history.

(56) References Cited

U.S. PATENT DOCUMENTS

| | | | | |
|---|---|---|---|---|
| 5,367,340 A | * | 11/1994 | Spencer | 348/607 |
| 5,818,964 A | | 10/1998 | Itoh | |
| 5,852,475 A | | 12/1998 | Gupta et al. | |
| 5,920,356 A | | 7/1999 | Gupta et al. | |
| 6,028,957 A | * | 2/2000 | Katori et al. | 382/162 |
| 7,145,953 B2 | | 12/2006 | Park et al. | |
| 7,324,701 B2 | * | 1/2008 | Nakami | 382/262 |
| 7,486,838 B2 | * | 2/2009 | Kanda | 382/275 |
| 7,492,823 B2 | * | 2/2009 | Lee et al. | 375/240.16 |
| 8,014,633 B2 | * | 9/2011 | Liu | 382/299 |

(Continued)

FOREIGN PATENT DOCUMENTS
EP    1447773 A    8/2004
EP    1486916 A    12/2004

*Primary Examiner* — Amir Alavi
(74) *Attorney, Agent, or Firm* — Greenblum & Bernstein, P.L.C.

(57) ABSTRACT

Image ringing noise is reduced by calculating a line spread function value of each pixel's luminance in an input image, dividing the input image into a plurality of blocks, and calculating an average value and a maximum value of the line spread function values for all pixels in each block. Based on the average value and the maximum value of the line spread function values of each block, whether a block is an interfered flat block or a non-interfered block is determined and the pixels in the interfered flat block are set as noisy pixels. Whether each pixel in the non-interfered block is an edge pixel or a non-edge pixel is determined and the non-edge pixels in the non-interfered block are set as noisy pixels. The noisy pixels thus set are smoothed, and the smoothed pixels are combined with the edge pixels for output as an output image.

16 Claims, 8 Drawing Sheets

U.S. PATENT DOCUMENTS

| | | |
|---|---|---|
| 2003/0112877 A1 | 6/2003 | Lee et al. |
| 2004/0022315 A1 | 2/2004 | Park et al. |
| 2004/0101050 A1 | 5/2004 | Lee et al. |
| 2004/0159812 A1 | 8/2004 | Kaneda et al. |
| 2005/0074182 A1 | 4/2005 | Lee et al. |
| 2008/0018506 A1* | 1/2008 | Raveendran .................... 341/51 |
| 2009/0310882 A1* | 12/2009 | Lin et al. ....................... 382/268 |

* cited by examiner

LEFTMOST PIXELS IN BLOCK    RIGHTMOST PIXELS IN BLOCK

BOTTOMMOST PIXELS IN BLOCK

Fig.8
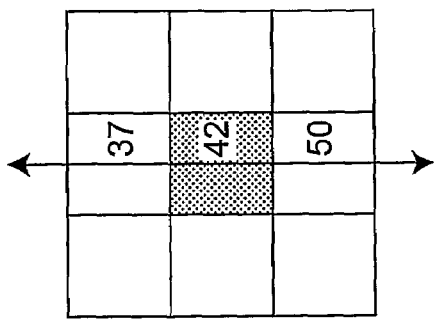
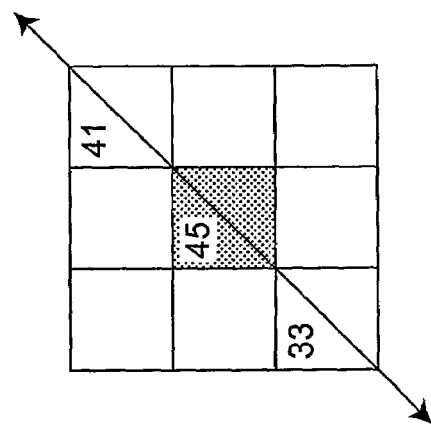
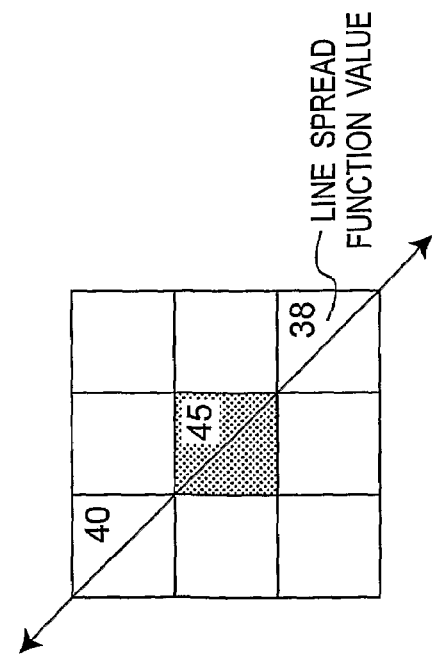

METHOD, APPARATUS AND INTEGRATED CIRCUIT CAPABLE OF REDUCING IMAGE RINGING NOISE

This application is a 371 of PCT/JP2007/065031, filed on Jul. 25, 2007.

TECHNICAL FIELD

The invention relates to a method, an apparatus and an integrated circuit capable of reducing ringing noise, more particularly to a method, an apparatus and an integrated circuit capable of reducing image ringing noise.

BACKGROUND ART

Nowadays, while high compression of image data can be achieved by image data encoding techniques, the pre-processing and post-processing of image data appear to be ever more important. Many techniques have been proposed for filtering noise generated when image data is acquired and encoded.

As shown in FIG. 1, U.S. Pat. No. 5,818,964 discloses a method and an apparatus for selecting an adaptive filter for image data. This prior art has been adopted by the Motion Picture Experts Group-4 (MPEG-4) standard to eliminate associated ringing noise. The noise filtering process 1 of this prior art consists of two sub-processes, that is, an index value generating unit 2 and a selective local smoothing unit 3. The index value generating unit 2 has a threshold value determining unit 4 and a binary index value unit 5. The selective local smoothing unit 3 has a filter selecting unit 6 and an adaptive filtering unit 7. First, an input image is inputted into the index value generating unit 2. Subsequently, the threshold value determining unit 4 calculates the maximum and minimum gray levels for every block consisting of 8×8 pixels in the input image to determine a threshold value. In the binary index value unit 5, the threshold value is compared with each pixel value in a corresponding block so as to generate binary indices. In the filter selecting unit 6, the binary indices are used as a basis to select a smoothing filter. The adaptive filtering unit 7 is for performing a smoothing filter process so as to adjust the gray level of a block.

However, since the abovementioned prior art uses the maximum and minimum pixel values in a corresponding block to determine the threshold value, textures and edges that only present local variations cannot be effectively detected. Therefore, the textures and the edges are likely to be classified as noise and smoothed, thereby reducing the sharpness in images. In addition, real noise may possibly be classified as textures or edges and thus not be removed. Therefore, a solution is necessary.

DISCLOSURE OF INVENTION

Therefore, the object of the present invention is to provide a method capable of reducing image ringing noise so as to improve quality of images or videos.

Accordingly, the method capable of reducing image ringing noise of the present invention comprises the following steps. First, a line spread function (LSF) value of each pixel's luminance in an input image is calculated. Then, the input image is divided into a plurality of blocks, and an average value and a maximum value of the line spread function values for all pixels in each block are calculated. Subsequently, based on the average value and the maximum value of the line spread function values of each block, it is determined whether a block is an interfered flat block or a non-interfered block. Next, the pixels in the interfered flat block are set as noisy pixels. Then, it is determined whether each pixel in the non-interfered block is an edge pixel or a non-edge pixel, and non-edge pixels in the non-interfered block are set as noisy pixels. Subsequently, smoothing the noisy pixels thus set is performed, and smoothed pixels are combined with the edge pixels for output as an output image.

Another object of the present invention is to provide an apparatus capable of reducing image ringing noise so as to improve quality of images or videos.

Accordingly, the apparatus capable of reducing image ringing noise of the present invention comprises a line spread function calculating unit, a characteristic value calculating unit, a block category determining unit, a noisy pixel setting unit, an edge pixel determining unit, and a pixel smoothing unit. The line spread function calculating unit is for calculating a line spread function value of each pixel's luminance in an input image. The characteristic value calculating unit is for dividing the input image into a plurality of blocks, and for calculating an average value and a maximum value of the line spread function values for all pixels in each block. The block category determining unit is for determining whether a block is an interfered flat block or a non-interfered block based on the average value and the maximum value of the line spread function values of each block. The noisy pixel setting unit is for setting the pixels in the interfered flat block as noisy pixels. The edge pixel determining unit is for determining whether each pixel in the non-interfered block is an edge pixel or a non-edge pixel, and for setting non-edge pixels in the non-interfered block as noisy pixels. The pixel smoothing unit is for smoothing noisy pixels thus set, and for combining smoothed pixels with the edge pixels for output as an output image.

Yet another object of the present invention is to provide an integrated circuit capable of reducing image ringing noise so as to improve quality of images or videos.

Accordingly, the integrated circuit capable of reducing image ringing noise of the present invention comprises a line spread function calculating unit, a characteristic value calculating unit, a block category determining unit, a noisy pixel setting unit, an edge pixel determining unit, and a pixel smoothing unit. The line spread function calculating unit is for calculating a line spread function value of each pixel's luminance in an input image. The characteristic value calculating unit is for dividing the input image into a plurality of blocks, and for calculating an average value and a maximum value of the line spread function values for all pixels in each block. The block category determining unit is for determining, based on the average value and the maximum value of the line spread function values of each block, whether a block is an interfered flat block or a non-interfered block. The noisy pixel setting unit is for setting the pixels in the interfered flat block as noisy pixels. The edge pixel determining unit is for determining whether each pixel in the non-interfered block is an edge pixel or a non-edge pixel, and for setting non-edge pixels in the non-interfered block as noisy pixels. The pixel smoothing unit is for smoothing noisy pixels thus set, and for combining smoothed pixels with the edge pixels for output as an output image.

BRIEF DESCRIPTION OF DRAWINGS

The aforesaid and other technical contents, features and advantages of the present invention will be clearly presented in the following detailed description of two preferred embodiments with reference to the accompanying drawings, of which:

FIG. 8 is a schematic diagram, illustrating a vague line detection step in a horizontal direction in the second preferred embodiment of the present invention.

BEST MODE FOR CARRYING OUT THE INVENTION

Before the present invention is described in greater detail, it should be noted herein that like elements are denoted by the same reference numbers throughout the following disclosure.

Figure 1:
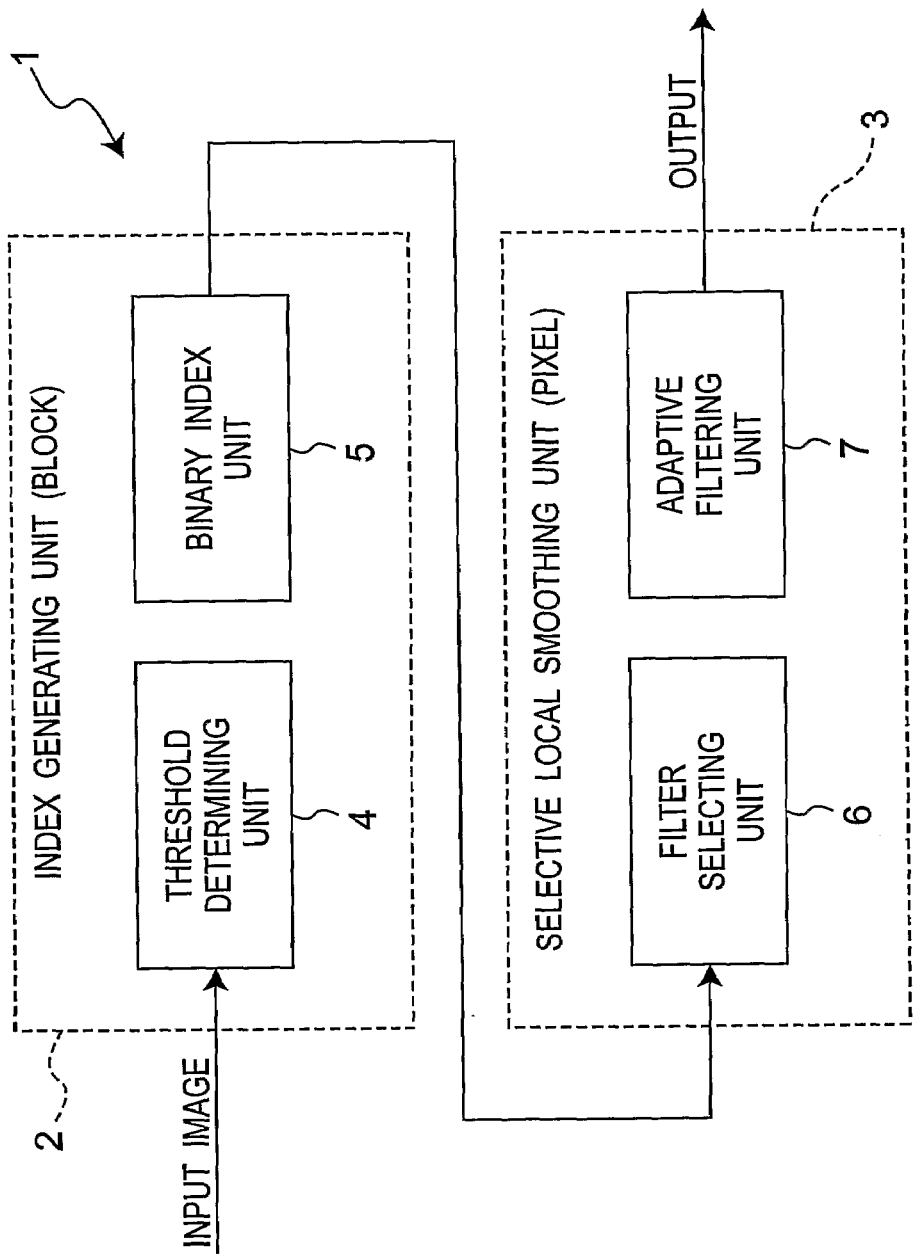
FIG. 1 is a function block diagram, illustrating a method and an apparatus for selecting an adaptive filter for image data in the prior art.
Figure 2:
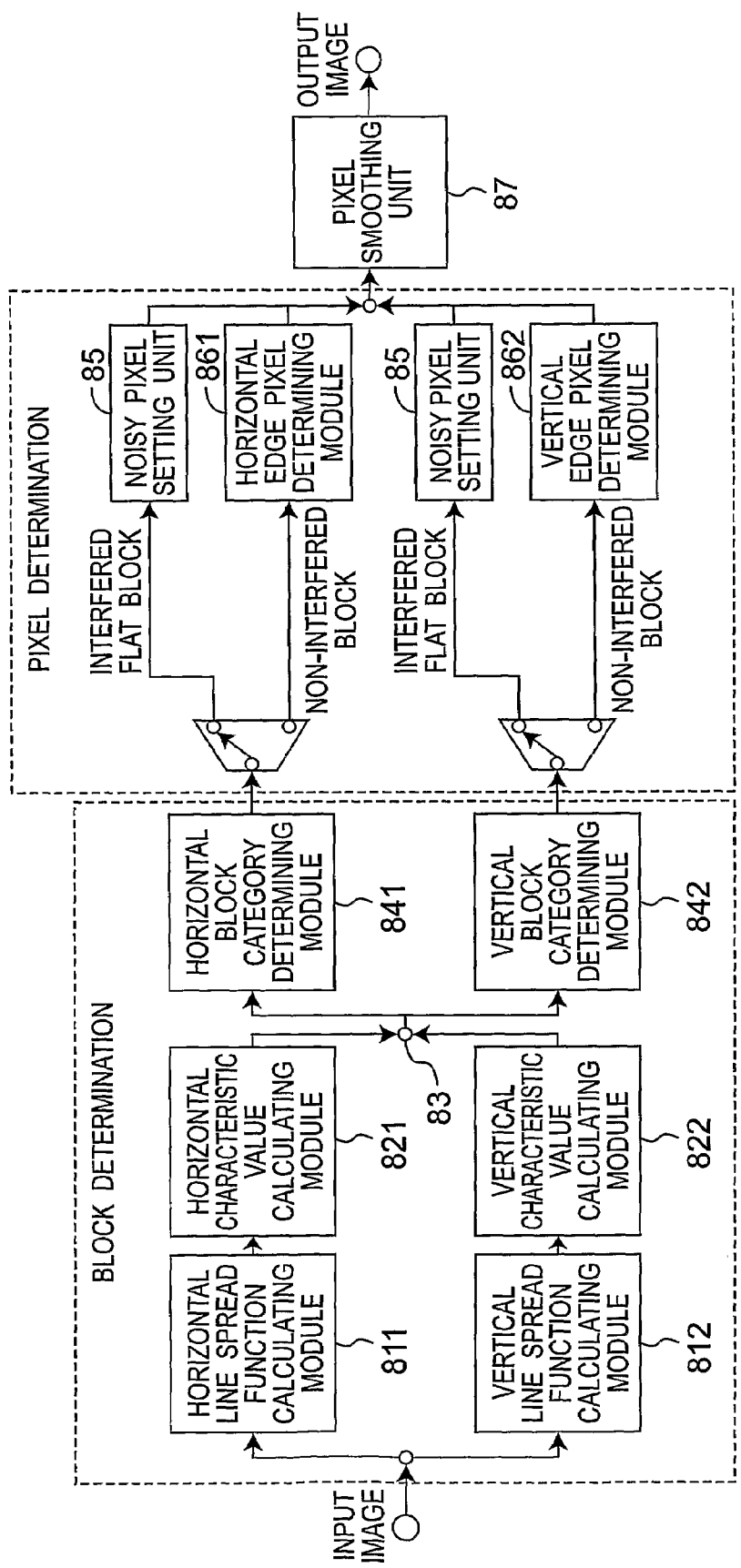
FIG. 2 is a function block diagram, illustrating a first preferred embodiment of an apparatus capable of reducing ringing noise according to the present invention.

Referring to FIG. 2, the first preferred embodiment of an apparatus capable of reducing ringing noise according to the present invention includes a line spread function calculating unit, a characteristic value calculating unit, a macro block processing unit 83, a block category determining unit, a noisy pixel setting unit 85, an edge pixel determining unit, and a pixel smoothing unit 87.

In the first preferred embodiment, some of the components of the apparatus according to the present invention can process images in a horizontal and a vertical direction, respectively, but should not be limited thereto. Therefore, as shown in FIG. 2, the line spread function calculating unit includes a horizontal line spread function calculating module 811 and a vertical line spread function calculating module 812. The characteristic value calculating unit includes a horizontal characteristic value calculating module 821 and a vertical characteristic value calculating module 822. The block category determining unit includes a horizontal block category determining module 841 and a vertical block category determining module 842. The edge pixel determining unit includes a horizontal edge pixel determining module 861 and a vertical edge pixel determining module 862.

The line spread function calculating unit is for calculating a line spread function value of each pixel's luminance in an input image.

The characteristic value calculating unit is for dividing the input image into a plurality of blocks, and for calculating an average value and a maximum value of the line spread function values for all pixels in each block, where each block is composed of, for example, 8×8 pixels.

The macro block processing unit 83 is for dividing the input image into a plurality of macro blocks (MBs), each of which is composed of a plurality of the blocks, and for setting a maximum line spread function value of a macro block to be the maximum of the line spread function values of the pixels contained in the macro block, where each macro block is composed of, for example, 2×2 blocks.

The block category determining unit is for determining whether a block is an interfered flat block or a non-interfered block based on the average value and the maximum value of the line spread function values of each block and the maximum line spread function value of the macro block containing the block.

The noisy pixel setting unit 85 is for setting the pixels in the interfered flat block as noisy pixels.

The edge pixel determining unit is for determining whether each pixel in the non-interfered block is an edge pixel or a non-edge pixel, and for setting non-edge pixels in the non-interfered block as noisy pixels.

The pixel smoothing unit 87 is for smoothing the noisy pixels thus set, and for combining smoothed pixels with the edge pixels for output as an output image.

Figure 3:
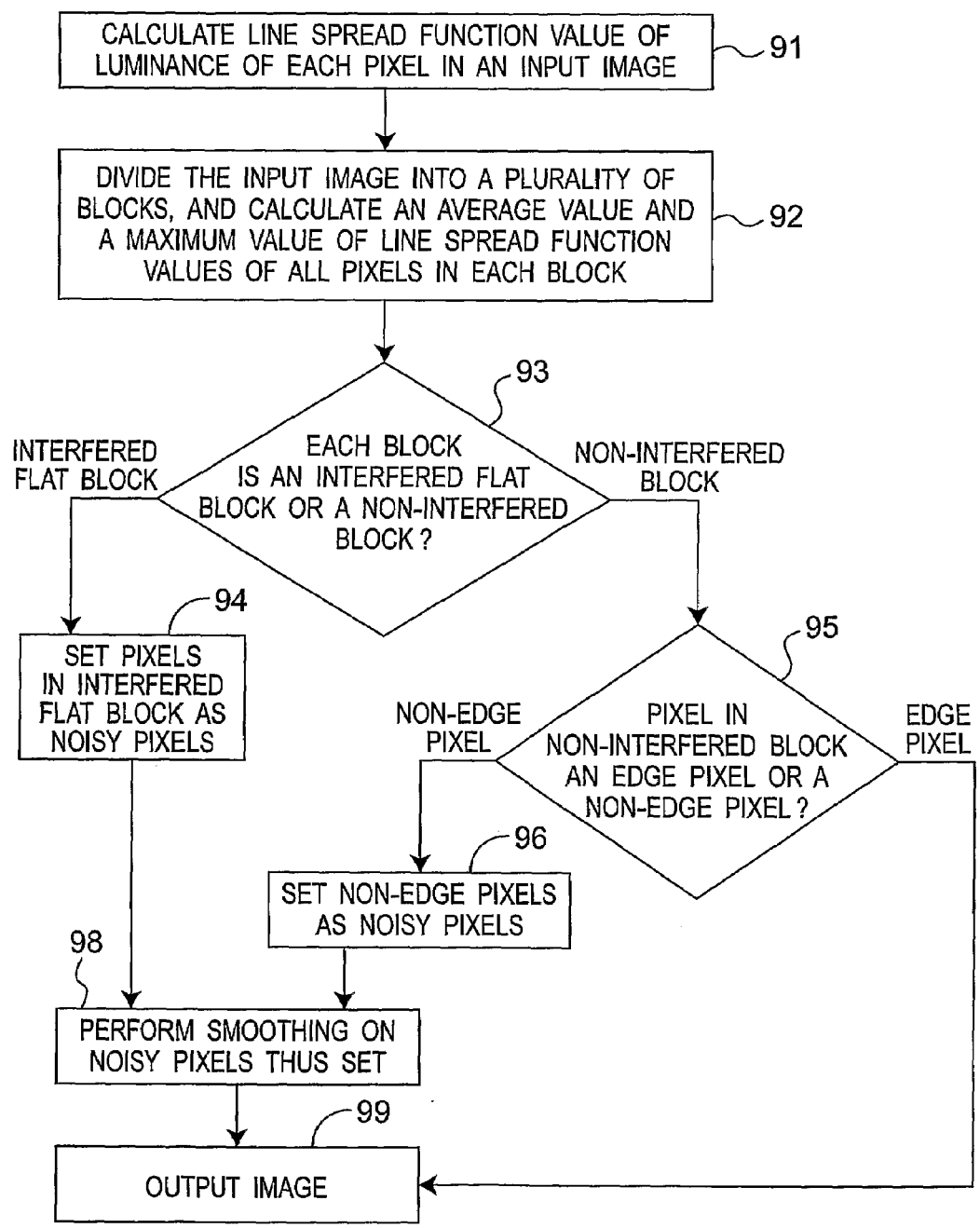
FIG. 3 is a flow chart, illustrating a first preferred embodiment of a method capable of reducing ringing noise according to the present invention.

Referring to FIGS. 2 and 3, the first preferred embodiment of a method capable of reducing ringing noise according to the present invention comprises the following steps. First, as shown in step 91, using the horizontal line spread function calculating module 811 and the vertical line spread function calculating module 812, the line spread function values $LSF_x$(i,j) and $LSF_y$(i,j) of a pixel's luminance in a two-dimensional position (i,j) in an input image, i.e., luminance $\phi$(i,j), are respectively calculated in the horizontal and vertical directions as shown in the following Equations (1) and (2).

$$LSF_x(i, j) = \nabla_x \phi(i, j) = \frac{\partial \phi(i, j)}{\partial x} = \phi(i, j) - \phi(i-1, j) \quad (1)$$

$$LSF_y(i, j) = \nabla_y \phi(i, j) = \frac{\partial \phi(i, j)}{\partial y} = \phi(i, j) - \phi(i, j-1) \quad (2)$$

Then, as shown in step 92, using the horizontal characteristic value calculating module 821 and the vertical characteristic value calculating module 822, the input image is divided into a plurality of blocks, and average values $Avg_x$, $Avg_y$ and maximum values $Max_x$, $Max_y$ of the line spread function values in the horizontal and vertical directions for all pixels in each block are calculated.

Subsequently, using the macro block processing unit 83, the input image is divided into a plurality of macro blocks, and a maximum line spread function value of a macro block, $MB\_Max_{x,y}$, is set to be the maximum of the line spread function values of the pixels contained in the macro block. In the first preferred embodiment, since each macro block is composed of 2×2=4 blocks, $MB\_Max_{x,y}$ for the macro block can be defined by the following Equation (3).

$$MB\_Max_{x,y} = \forall_{i=1:4} \max(Max_{i(x)}, Max_{i(y)}) \quad (3)$$

Figure 4:
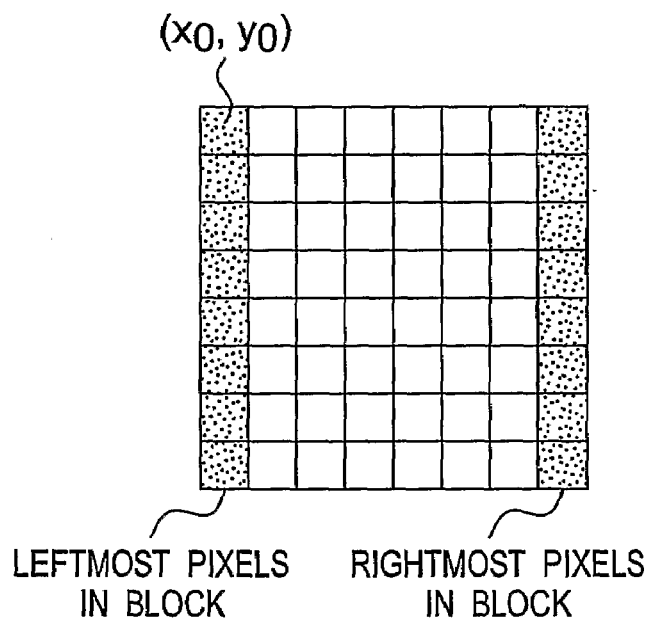
FIG. 4 is a schematic diagram to illustrate a horizontal block category determining module in the embodiment of the present invention adding absolute values of edge pixel luminance differences in a horizontal direction of each block to serve as a corresponding change trend value $Trend_x$ for the respective block, where the edge pixels refer to the horizontally leftmost and rightmost pixels in the block.
Figure 5:
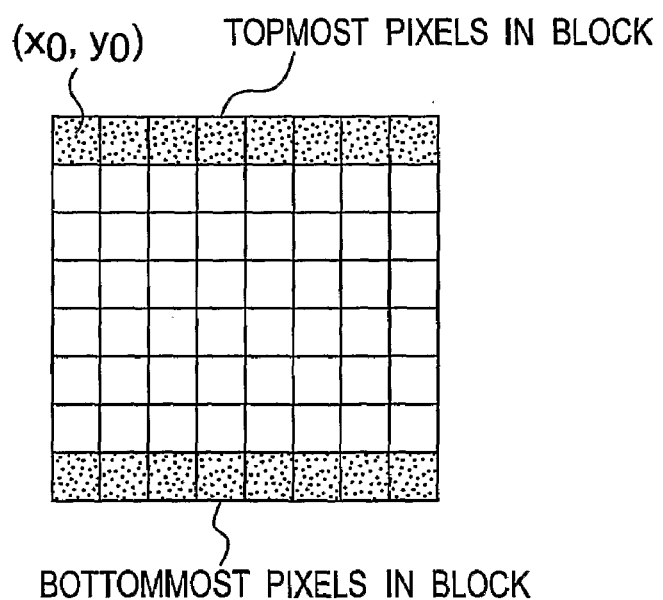
FIG. 5 is a schematic diagram to illustrate a vertical block category determining module in the embodiment of the present invention adding absolute values of edge pixel luminance differences in a vertical direction of each block to serve as a corresponding change trend value $Trend_y$ for the respective block, where the edge pixels refer to the vertically topmost and bottommost pixels in the block.

With further reference to FIGS. 4 and 5, next as shown in step 93, using the horizontal block category determining module 841 and the vertical block category determining module 842, the absolute values of edge pixels' luminance differences in every block are added horizontally and vertically to serve as corresponding change trend values $Trend_x$, $Trend_y$ for the block, where the edge pixels refer to the leftmost and rightmost pixels in the horizontal direction in the block, and the topmost and bottommost pixels in the vertical direction in the block. In the first preferred embodiment, since each block is composed of 8×8 pixels, $Trend_x$, $Trend_y$ can be obtained using the following Equations (4), (5), where the left top corner of each block has a coordinate $(x_0, y_0)$ on the image, and abs denotes the absolute value function.

$$Trend_x = \sum_{j=y_0}^{y_0+7} abs(\phi(i, j) - \phi(i+7, j)) \quad (4)$$

$$Trend_y = \sum_{i=x_0}^{x_0+7} abs(\phi(i, j) - \phi(i, j+7)) \quad (5)$$

Subsequently, based on the following conditional determination equations (6), (7), the horizontal block category determining module 841 and the vertical block category determining module 842 determine, horizontally and vertically, whether the maximum line spread function value of the macro block containing the block, $MB\_Max_{x,y}$, is greater than a macro block threshold value $MB\_Thr$, whether the maximum values of the line spread function values of the block $Max_x$, $Max_y$ are smaller than a flat threshold value FlatThr, and whether the change trend values $Trend_x$, $Trend_y$ of the block's luminance are smaller than a trend threshold value TrendThr. If the result of the determination is yes, then the block is an interfered flat block. Otherwise, the block is a non-interfered block.

In the horizontal direction:

if $(MB\_Max_{x,y} \geq MB\_Thr)$ and $(Max_x < FlatThr)$ and $(Trend_x < TrendThr)$ (6)

the block is an interfered flat block;
else
the block is a non-interfered block
In the vertical direction:

if $(MB\_Max_{x,y} \geq MB\_Thr)$ and $(Max_y < FlatThr)$ and $(Trend_y < TrendThr)$ (7)

the block is an interfered flat block;
else
the block is a non-interfered block

When a block is determined to be an interfered flat block, as shown in step 94, the noisy pixel setting unit 85 sets the pixels in the interfered flat block as noisy pixels.

On the other hand, when a block is determined to be a non-interfered block, as shown in step 95, the horizontal edge pixel determining module 861 and the vertical edge pixel determining module 862 determine, horizontally and vertically, whether each pixel in the non-interfered block is an edge pixel or a non-edge pixel, that is, first according to the following conditional determination equations (8), (9), for each block, it is determined horizontally and vertically whether the average values $Avg_x$, $Avg_y$ of the line spread function values of the block are greater than an average threshold, AvgThr, or whether the maximum values $Max_x$, $Max_y$ of the line spread function values of the block are greater than a maximum threshold value MaxThr. If the determination result is yes, edge threshold values $EdgeThr_x$, $EdgeThr_y$ are respectively set to be the smaller of one half of the maximum value $Max_x$ or $Max_y$ of the line spread function values and a predefined maximum edge value MaxEdge. Otherwise, the edge threshold values $EdgeThr_x$, $EdgeThr_y$ are the maximum values $Max_x$, $Max_y$ of the line spread function values.

In the horizontal direction:

if $(Avg_x > AvgThr)$ or $(Max_x > MaxThr)$ (8)
    $EdgeThr_x = min(MaxEdge, Max_x/2)$;
else
    $EdgeThr_x = Max_x$ In the vertical Direction:

if $(Avg_y > AvgThr)$ or $(Max_y > MaxThr)$ (9)
    $EdgeThr_y = min(MaxEdge, Max_y/2)$;
else
    $EdgeThr_y = Max_y$ Subsequently, based on the following conditional determination equations (10), (11), for a pixel located at position (i,j), it is determined horizontally and vertically whether its line spread function values $LSF_x(i,j)$, $LSF_y(i,j)$ are greater than the edge threshold value $EdgeThr_x$, $EdgeThr_y$ respectively. If the determination result is yes, then the pixel is an edge pixel. Otherwise, the pixel is a non-edge pixel.

In the horizontal direction:

if $(LSF_x(i,j) > EdgeThr_x)$ (10)
    the pixel is an edge pixel;
else the pixel is a non-edge pixel In the vertical direction:

if $(LSF_y(i,j) > EdgeThr_y)$ (11)
    the pixel is an edge pixel;
else
    the pixel is a non-edge pixel Furthermore, when a pixel in the non-interfered block is determined to be a non-edge pixel, as shown in step 96, the horizontal edge pixel determining module 861 and the vertical edge determining module 862 further set the non-edge pixel as a noisy pixel.

Next, as shown in step 98, using the pixel smoothing unit 87, smoothing is performed on each noisy pixel thus set in steps 94 and 96. In the first preferred embodiment, a low pass filter (LPF) as shown in the following matrix (12) can be used to perform smoothing on each noisy pixel thus set in steps 94 and 96, in which one of possible setting methods is to set a value (b) as two times a value (a) and a value (c) as two times the value (b), but is not limited thereto, as long as the value (c) is enhanced to be distinguishable from the values (a) and (b).

$$\frac{1}{4a+4b+c} \begin{array}{|c|c|c|} \hline a & b & a \\ \hline b & c & b \\ \hline a & b & a \\ \hline \end{array} \quad (12)$$

Next, as shown in step 99, the noisy pixels that have been smoothed by the pixel smoothing unit 87 and the edge pixels can be combined together, and outputted as an output image with reduced ringing noise and maintained texture and pattern information.

Figure 6:
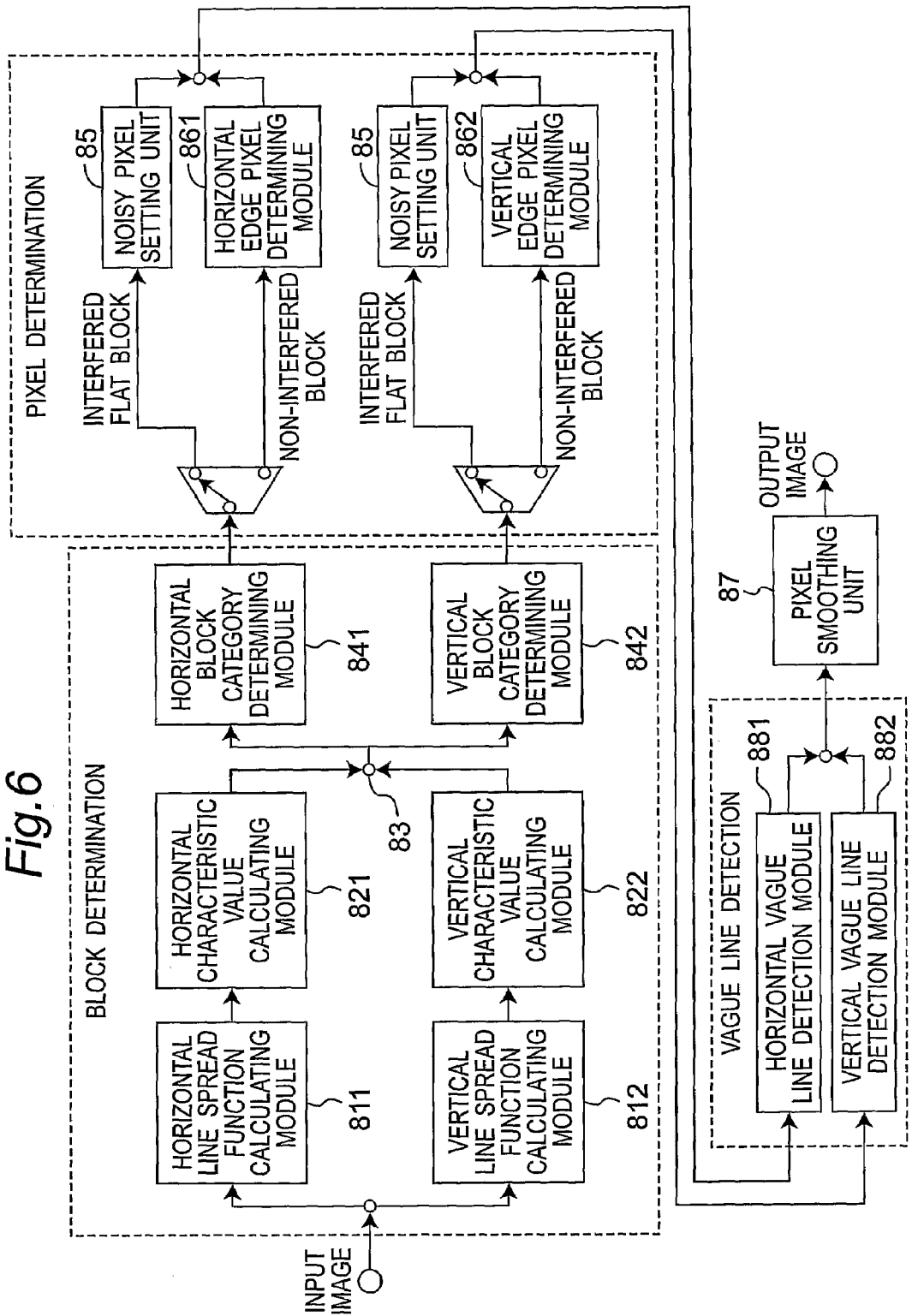
FIG. 6 is a function block diagram, illustrating a second preferred embodiment of an apparatus capable of reducing ringing noise according to the present invention.
Figure 7:
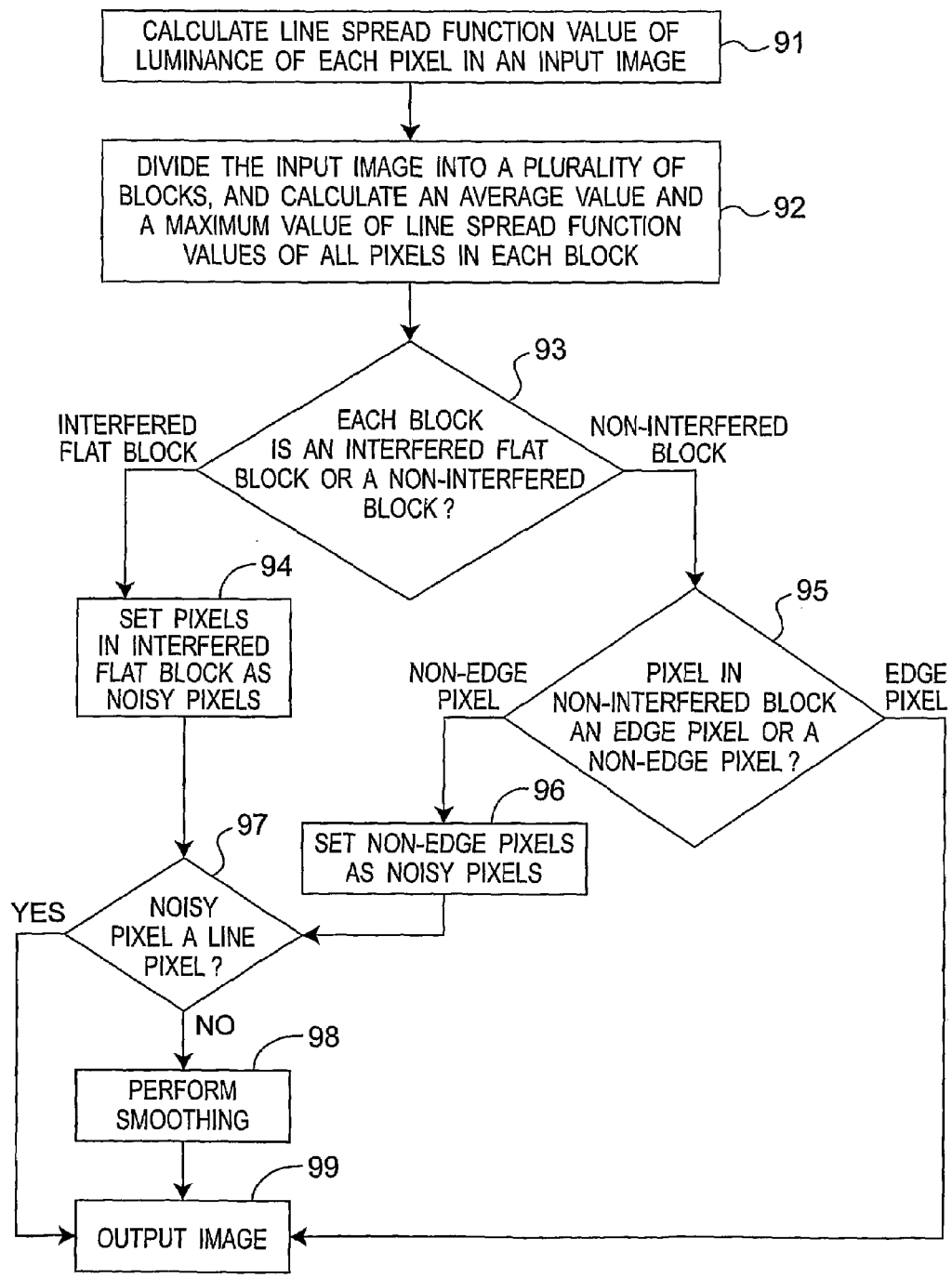
FIG. 7 is a flow chart, illustrating a second preferred embodiment of a method capable of reducing ringing noise according to the present invention.

As shown in FIGS. 6 and 7, aside from all of the components in the first preferred embodiment of the apparatus according to the present invention shown in FIG. 2, the second preferred embodiment of the apparatus according to the present invention further comprises a vague line detection unit that includes a horizontal vague line detection module 881 and a vertical vague line detection module 882 for determining horizontally and vertically whether the noisy pixels thus set are line pixels. If the determination result is yes, smoothing on the noisy pixels by the pixel smoothing unit 87 is not necessary. Steps 91~96 for the second preferred embodiment of the method according to the present invention illustrated in FIG. 7 are identical to those illustrated in FIG. 6. The difference lies in that, in the second preferred embodiment, as shown in step 97, it is necessary to use the horizontal vague line detection module 881 and the vertical vague line detection module 882 to determine horizontally and vertically directions whether each noisy pixel is a line pixel. If the determination result is yes, then the noisy pixel does not require smoothing. On the other hand, if the determination result is no, then, as shown in step 98, smoothing is performed on each noisy pixel that is a non-line pixel using the pixel smoothing unit 87. In the second preferred embodiment, the low pass filter as shown in the above matrix (12) can also be used to perform smoothing on the noisy pixels that are non-line pixels. Next, as shown in step 99, the noisy pixels that have been smoothed by the pixel smoothing unit 87, the noisy pixels that need no smoothing (i.e., the line pixels) and the edge pixels can be combined together, and outputted as an output image with reduced ringing noise and maintained texture and pattern information.

The details regarding step 97 in the second preferred embodiment are as follows. First, as shown in Equations (13), (14), horizontal and vertical line threshold values $LineThr_x$, $LineThr_y$ of a block are determined, where $EdgeThr_x$, $EdgeThr_y$ are horizontal and vertical edge threshold values of the block, and MaxLineThr is a predefined maximum line threshold value.

$$LineThr_x = Max(EdgeThr_x/2, MaxLineThr) \quad (13)$$

$$LineThr_y = Max(EdgeThr_y/2, MaxLineThr) \quad (14)$$

Figure 9:
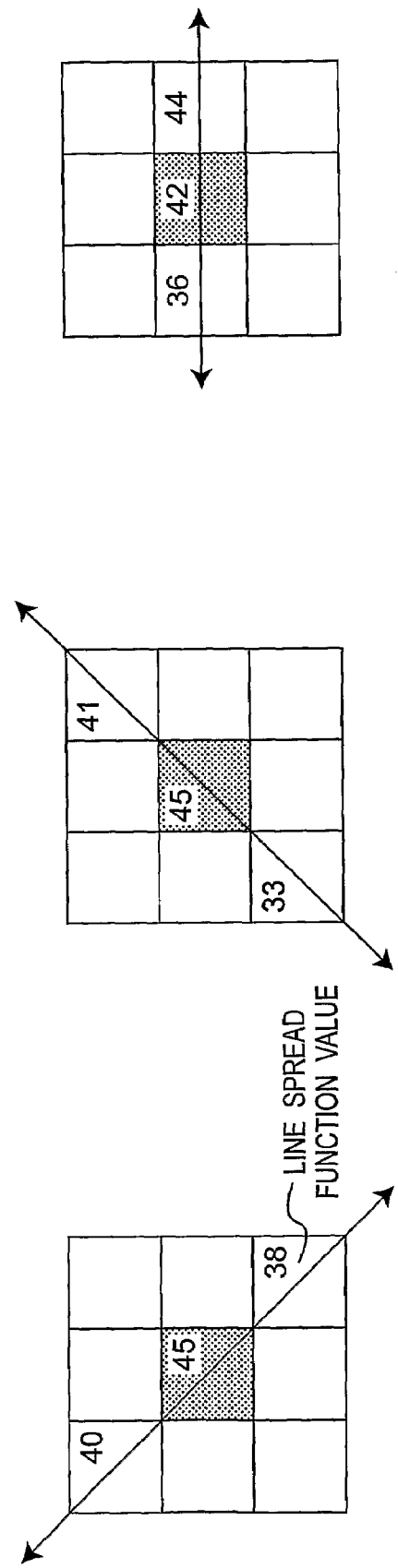
FIG. 9 is a schematic diagram, illustrating a vague line detection step in a vertical direction in the second preferred embodiment of the present invention.

With further reference to FIGS. 8 and 9, subsequently, determination equations (15), (16) and three 1×3 windows (its center cell being a pixel with shading) are used to check whether each noisy pixel is a line pixel. As shown in FIG. 8, take the horizontal direction as an example, if the $LSF_x$ of three consecutive windows are all greater than $LineThr_x$ or all smaller than $-LineThr_x$, the noisy pixel located in the center cell is a line pixel.

In the horizontal direction:

if $(LSF_x(i,j) > LineThr_x$ and $LSF_x(i+1,j+1) > LineThr_x$
    and $LSF_x(i-1,j-1) > LineThr_x)$ or $(LSF_x(i,j) > LineThr_x$ and $LSF_x(i+1,j-1) > LineThr_x$
    and $LSF_x(i-1,j+1) > LineThr_x)$ or $(LSF_x(i,j) > LineThr_x$ and $LSF_x(i,j-1) > LineThr_x$ and
    $LSF_x(i,j+1) > LineThr_x)$ or $(LSF_x(i,j) < -LineThr_x$ and $LSF_x(i+1,j+1) < -LineThr_x$
    and $LSF_x(i-1,j-1) < -LineThr_x)$ or $(LSF_x(i,j) < -LineThr_x$ and $LSF_x(i+1,j-1) < -LineThr_x$
    and $LSF_x(i-1,j+1) < -LineThr_x)$ or $(LSF_x(i,j) < -LineThr_x$ and $LSF_x(i,j-1) < -LineThr_x$
    and $LSF_x(i,j+1) < -LineThr_x)$ \quad (15)

the pixel is a line pixel;

In the vertical direction:

if $(LSF_y(i,j) > LineThr_y$ and $LSF_y(i+1,j+1) > LineThr_y$
    and $LSF_y(i-1,j-1) > LineThr_y)$ or $(LSF_y(i,j) > LineThr_y$ and $LSF_y(i+1,j-1) > LineThr_y$
    and $LSF_y(i-1,j+1) > LineThr_y)$ or $(LSF_y(i,j) > LineThr_y$ and $LSF_y(i-1,j) > LineThr_y$ and
    $LSF_y(i+1,j) > LineThr_y)$ or $(LSF_y(i,j) < -LineThr_y$ and $LSF_y(i+1,j+1) < -LineThr_y$
    and $LSF_y(i-1,j-1) < -LineThr_y)$ or $(LSF_y(i,j) < -LineThr_y$ and $LSF_y(i+1,j-1) < -LineThr_y$
    and $LSF_y(i-1,j+1) < -LineThr_y)$ or $(LSF_y(i,j) < -LineThr_y$ and $LSF_y(i-1,j) < -LineThr_y$
    and $LSF_y(i+1,j) < -LineThr_y)$ \quad (16)

the pixel is a line pixel;

Referring to FIGS. 2 and 6, furthermore, a first preferred embodiment of the integrated circuit according to the present invention comprises the horizontal line spread function calculating module 811, the vertical line spread function calculating module 812, the horizontal characteristic value calculating module 821, the vertical characteristic value calculating module 822, the macro block processing unit 83, the horizontal block category determining module 841, the vertical block category determining module 842, the noisy pixel setting unit 85, the horizontal edge pixel determining module 861, the vertical edge pixel determining module 862, and the pixel smoothing unit 87 shown in FIG. 2. Moreover, a second preferred embodiment of the integrated circuit according to the present invention comprises the horizontal line spread function calculating module 811, the vertical line spread function calculating module 812, the horizontal characteristic value calculating module 821, the vertical characteristic value calculating module 822, the macro block processing unit 83, the horizontal block category determining module 841, the vertical block category determining module 842, the noisy pixel setting unit 85, the horizontal edge pixel determining module 861, the vertical edge pixel determining module 862, the horizontal vague line detection module 881, the vertical vague line detection module 882, and the pixel smoothing unit 87 shown in FIG. 6.

Therefore, through the present invention, an improvement of the quality of images or videos can be achieved for the following reasons. First, through the use of line spread function values, edges and textures can be completely and accurately detected. This makes the present invention more capable of finding edges and textures with local variations compared to the aforementioned prior art. Second, in the preferred embodiments, since the images are handled separately in horizontal and vertical directions, the characteristics of horizontal and vertical variations can be used separately without interfering with each other. Moreover, the present invention is capable of operating alone without being connected to an image decoder and merely receiving noisy images.

In sum, in the method, apparatus and integrated circuit capable of reducing image ringing noise of this invention, through the steps of calculating the line spread function values of the pixels' luminance, it can be determined whether a block is an interfered flat block or a non-interfered block, and each pixel in the interfered flat block can be set as a noisy pixel. Next, the pixels in the non-interfered block can be classified into non-edge pixels and edge pixels, and each non-edge pixel can be set as a noisy pixel. Subsequently, the noisy pixels are smoothed, and the smoothed pixels are combined with the edge pixels for output. Therefore, ringing noise is removed so that the quality of images or videos is improved.

However, the abovedescribed are merely the preferred embodiments of the present invention, and should not be taken to limit the scope of implementation of the present invention. In other words, any simple equivalent variation and modification based on the claims and the contents of the specification of the present invention are included within the scope of the present invention.

INDUSTRIAL APPLICABILITY

The present invention can be applied to a method, apparatus and integrated circuit capable of reducing image ringing noise.

The invention claimed is:

1. A method capable of reducing image ringing noise, comprising:
    calculating a line spread function value of a luminance of each pixel in an input image;
    dividing the input image into a plurality of blocks, and calculating an average value and a maximum value of the line spread function values for all pixels in each block;
    based on the average value and the maximum value of the line spread function values of each block, determining whether a block is an interfered flat block or a non-interfered block;
    setting the pixels in the interfered flat block as noisy pixels;
    determining whether each pixel in the non-interfered block is an edge pixel or a non-edge pixel, and setting the non-edge pixels in the non-interfered block as noisy pixels; and
    smoothing the set noisy pixels, and combining smoothed pixels with the edge pixels for output as an output image.

2. The method capable of reducing image ringing noise as claimed in claim 1, wherein, in the calculating, the line spread function value of the luminance of each pixel can be calculated as respective gradients of the luminance in horizontal and vertical directions.

3. The method capable of reducing image ringing noise as claimed in claim 1, wherein, in the dividing, the input image is further divided into a plurality of macro blocks, and each macro block is composed of a plurality of the blocks.

4. The method capable of reducing image ringing noise as claimed in claim 3, wherein the determining whether a block is an interfered block includes:
    calculating a maximum value of the line spread function values of each macro block;
    for each block, adding absolute values of edge pixels' luminance differences horizontally and vertically to serve as corresponding change trend values respectively, where the edge pixels refer to the leftmost and rightmost pixels in the horizontal direction in the block and the topmost and bottommost pixels in the vertical direction in the block; and
    determining horizontally and vertically whether the maximum line spread function value of the macro block containing the block is greater than a macro block threshold value, whether the maximum values of the line spread function values of the block are smaller than a flat threshold value, and whether the change trend values of the luminance of the block are smaller than a trend threshold value, the block being an interfered flat block if the result of determination is yes, otherwise the block being a non-interfered block.

5. The method capable of reducing image ringing noise as claimed in claim 1, wherein determining whether each pixel in the non-interfered block is an edge pixel includes:
    for each non-interfered block, setting respective edge threshold values horizontally and vertically, where when an average value of the line spread function values in one direction is greater than an average threshold, or a maximum value of the line spread function values in the one direction is greater than a maximum threshold value, the edge threshold value in the one direction is set to be the smaller of one half of the corresponding maximum value of the line spread function values and a predefined maximum edge value, otherwise the edge threshold value is set to be the corresponding maximum value of the line spread function values; and
    for each pixel in the non-interfered block, determining horizontally and vertically whether line spread function values are greater than corresponding edge threshold values, the pixel being an edge pixel if the result of determination is yes, otherwise the pixel being a non-edge pixel.

6. The method capable of reducing image ringing noise as claimed in claim 1, wherein the smoothing includes determining horizontally and vertically whether each noisy pixel is a line pixel so that smoothing is not performed on the noisy pixel if the pixel is determined to be a line pixel.

7. An apparatus capable of reducing image ringing noise, comprising:
    a line spread function calculator that calculates a line spread function value of a luminance of each pixel in an input image;
    a characteristic value calculator that divides the input image into a plurality of blocks, and that calculates an average value and a maximum value of the line spread function values for all pixels in each block;
    a block category determiner that determines, based on the average value and the maximum value of the line spread function values of each block, whether a block is an interfered flat block or a non-interfered block;
    a noisy pixel setter that sets the pixels in the interfered flat block as noisy pixels;
    an edge pixel determiner that determines whether each pixel in the non-interfered block is an edge pixel or a non-edge pixel, and that sets the non-edge pixels in the non-interfered block as noisy pixels; and
    a pixel smoother that smoothes the set noisy pixels, and that combines smoothed pixels with the edge pixels for output as an output image.

8. The apparatus capable of reducing image ringing noise as claimed in claim 7, wherein the line spread function calculator calculates gradients of the luminance of each pixel in horizontal and vertical directions so as to serve as its corresponding line spread function value.

9. The apparatus capable of reducing image ringing noise as claimed in claim 7, further comprising a macro block processor that divides the input image into a plurality of macro blocks, each macro block being composed of a plurality of the blocks, and that sets a maximum line spread function value of a macro block to be the maximum of the line spread function values of the pixels contained in the macro block, and the block category determiner adds, for each block, the absolute values of edge pixels' luminance differences horizontally and vertically, to serve as corresponding change trend values respectively, where the edge pixels refer to the leftmost and rightmost pixels in the horizontal direction in the block, and the topmost and bottommost pixels in the vertical direction in the block, and then determines horizontally and vertically whether the maximum line spread function value of the macro block containing the block is greater than a macro block threshold value, whether the maximum values of the line spread function values of the block are smaller than a flat threshold value, and whether the change trend values of the luminances of the block are smaller than a trend threshold value, the block being an interfered flat block if the result of determination is yes, otherwise the block being a non-interfered block.

10. The apparatus capable of reducing image ringing noise as claimed in claim 7, wherein the edge pixel determiner determines, for each non-interfered block, respective edge threshold values horizontally and vertically, where when the average value of the line spread function values in one direction is greater than an average threshold, or the maximum value of the line spread function values in the one direction is greater than a maximum threshold value, sets the edge threshold value in the one direction to be the smaller of one half of the corresponding maximum value of the line spread function values and a predefined maximum edge value, and otherwise sets the edge threshold value to be the corresponding maximum value of the line spread function values, and subsequently for each pixel therein, determines horizontally and vertically whether the line spread function values are greater than corresponding edge threshold values, the pixel being an edge pixel if the result of determination is yes, otherwise the pixel being a non-edge pixel.

11. The apparatus capable of reducing image ringing noise as claimed in claim 7, further comprising a vague line detector that determines horizontally and vertically whether each noisy pixel is a line pixel, wherein smoothing the noisy pixels by the pixel smoothing unit is not performed if the result of determination is yes.

12. An integrated circuit capable of reducing image ringing noise, comprising:
a line spread function calculator that calculates a line spread function value of a luminance of each pixel in an input image;
a characteristic value calculator that divides the input image into a plurality of blocks, and that calculates an average value and a maximum value of the line spread function values for all pixels in each block;
a block category determiner that determines, based on the average value and the maximum value of the line spread function values of each block, whether a block is an interfered flat block or a non-interfered block;
a noisy pixel setter that sets the pixels in the interfered flat block as noisy pixels;
an edge pixel determiner that determines whether each pixel in the non-interfered block is an edge pixel or a non-edge pixel, and that sets the non-edge pixels in the non-interfered block as noisy pixels; and
a pixel smoother that smoothes the set noisy pixels, and that combines smoothed pixels with the edge pixels for output as an output image.

13. The integrated circuit capable of reducing image ringing noise as claimed in claim 12, wherein the line spread function calculator calculates gradients of the luminance of each pixel in horizontal and vertical directions so as to serve as the corresponding line spread function value.

14. The integrated circuit capable of reducing image ringing noise as claimed in claim 12, further comprising a macro block processor that divides the input image into a plurality of macro blocks, each macro block being composed of a plurality of the blocks, and for setting a maximum line spread function value of a macro block to be the maximum of the line spread function values of the pixels contained in the macro block, and the block category determiner adds, for each block, the absolute values of edge pixels' luminance differences horizontally and vertically, to serve as corresponding change trend values respectively, where the edge pixels refer to the leftmost and rightmost pixels in the horizontal direction in the block, and the topmost and bottommost pixels in the vertical direction in the block, and then determines horizontally and vertically whether the maximum line spread function value of the macro block containing the block is greater than a macro block threshold value, whether the maximum values of the line spread function values of the block are smaller than a flat threshold value, and whether the change trend values of the luminance of the block are smaller than a trend threshold value, the block being an interfered flat block if the result of determination is yes, otherwise the block being a non-interfered block.

15. The integrated circuit capable of reducing image ringing noise as claimed in claim 12, wherein the edge pixel determiner determines, for each non-interfered block, respective edge threshold values horizontally and vertically, where when the average value of the line spread function values in one direction is greater than an average threshold, or the maximum value of the line spread function values in the one direction is greater than a maximum threshold value, sets the edge threshold value in the one direction to be the smaller of one half of the corresponding maximum value of the line spread function values and a predefined maximum edge value if the result of determination is yes, and otherwise sets the edge threshold value to be the corresponding maximum value of the line spread function values, and subsequently for each pixel therein, determines horizontally and vertically whether the line spread function values are greater than corresponding edge threshold values, the pixel being an edge pixel if the result of determination is yes, otherwise the pixel being a non-edge pixel.

16. The integrated circuit capable of reducing image ringing noise as claimed in claim 12, further comprising a vague line detector that determines horizontally and vertically, whether each noisy pixel is a line pixel, wherein smoothing the noisy pixels by the pixel smoother is not performed if the result of determination is yes.

* * * * *